Figure 1:
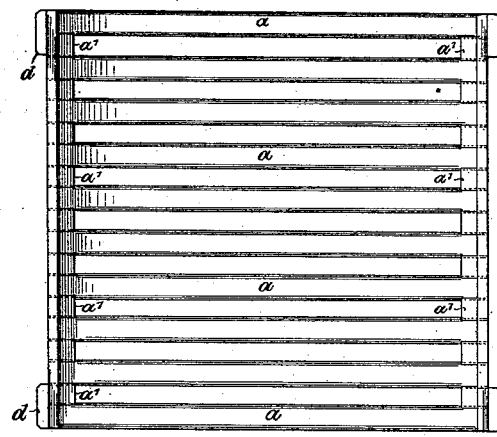

(No Model.) 2 Sheets—Sheet 1.

H. A. ORR.
DRYING TRAY.

No. 572,660. Patented Dec. 8, 1896.

Witnesses
H. van Ildennell
E. A. Scott

Inventor
Henry Adair Orr
by Richards
Attorneys (No Model.) 2 Sheets—Sheet 2.

H. A. ORR.
DRYING TRAY.

No. 572,660. Patented Dec. 8, 1896.

Witnesses
H. van Oldenneel
E. A. Scott

Inventor
Henry Adair Orr
by Richardson
Attorneys

UNITED STATES PATENT OFFICE.

HENRY ADAIR ORR, OF BEDFORD, ENGLAND.

DRYING-TRAY.

SPECIFICATION forming part of Letters Patent No. 572,660, dated December 8, 1896.

Application filed October 25, 1895. Serial No. 566,893. (No model.) Patented in England January 14, 1895, No. 896.

*To all whom it may concern:*

Be it known that I, HENRY ADAIR ORR, a subject of the Queen of the United Kingdom of Great Britain and Ireland, residing at Pemberley Cottage, Bedford, England, have invented certain new and useful Improvements in Trays for the Storage or Exhibition of Fruit and the Like, (for which I have obtained the following patent: Great Britain and Ireland, No. 896, dated January 14, 1895;) and I do hereby declare that the following is a full, clear, and exact description of the invention, reference being made to the accompanying drawings, which are to be taken as part of this specification and read therewith, and one which will enable others skilled in the art to which it appertains to make and use the same.

My invention relates to improvements in trays adapted for use in handling, sorting, storing, or exhibiting fruit and other light and perishable goods, edible or otherwise.

The object of the invention is to provide a tray complete in itself and, further, one adapted (*a*) by being combined with a series of duplicates of itself to produce a practicable and self-supporting vertical series of shelves possessing distinctive properties; (*b*) by being combined in a specific way with a duplicate of itself to provide a stronger tray having the same practicable area as the uncombined tray as well as an upstanding side along each of the four edges of the said stronger tray; (*c*) by being combined in a specific way with a duplicate of itself to provide a stronger tray having the same practicable area as the uncombined tray, as well as an upstanding side along each of the four edges of the said stronger tray, and adapted, by being combined with a series of duplicates of itself, to produce a practicable and self-supporting vertical series of trays or shelves; (*d*) by being combined in a specific way with a duplicate of itself to economize space in respect of storage or of transit.

The invention includes the combination, with the floor or bottom of the tray, of a removable vertical ledge fixed along either or along both the unprotected edges of the said floor or bottom, one such ledge being adapted to prevent the tray being distorted by the weight of the fruit upon it, and two such ledges, one along each unprotected edge, being adapted to prevent the fruit rolling over the respective edge in the event of the opposite one being tipped up.

Figure 2:
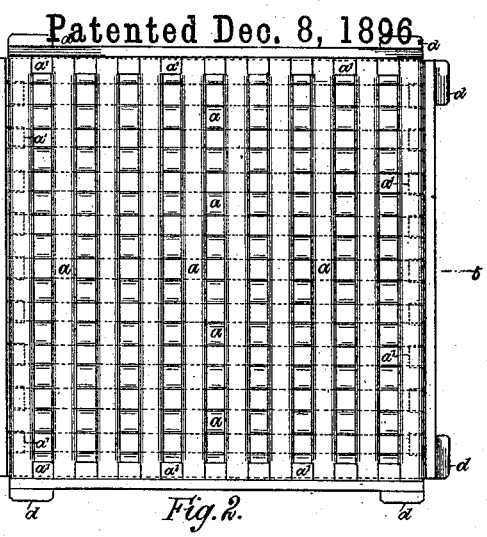
Figure 3:
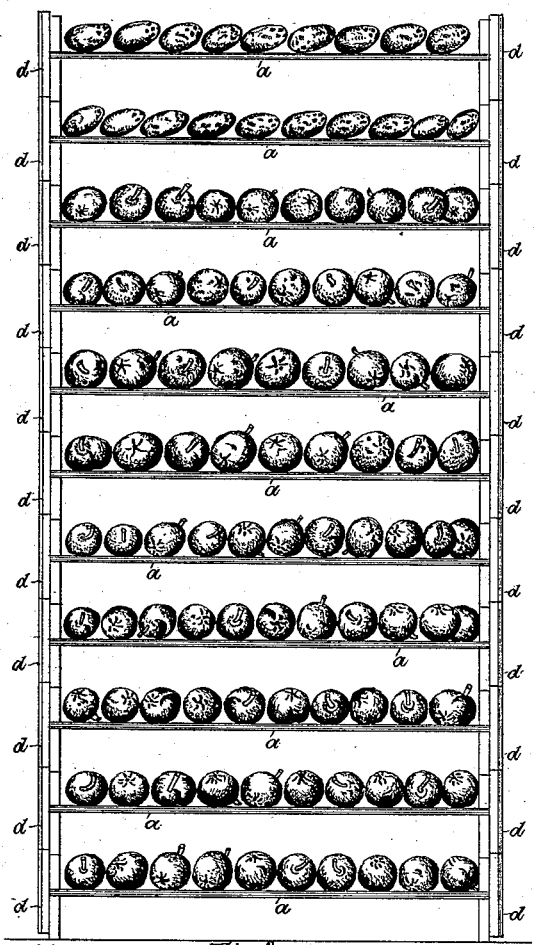
Figure 4:
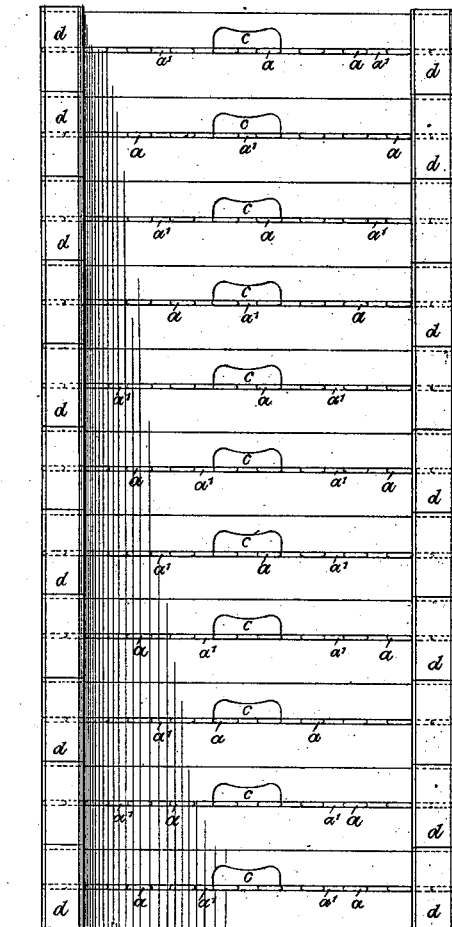
Figures 5, 6:
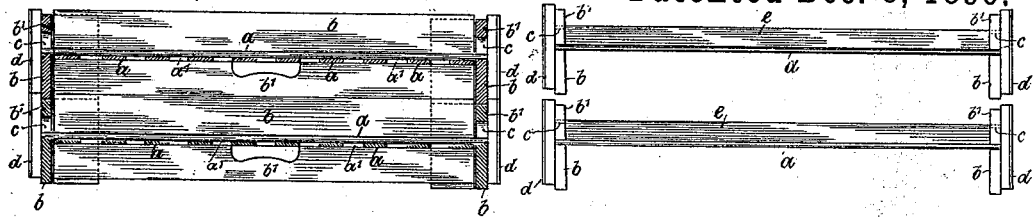
Figure 7:
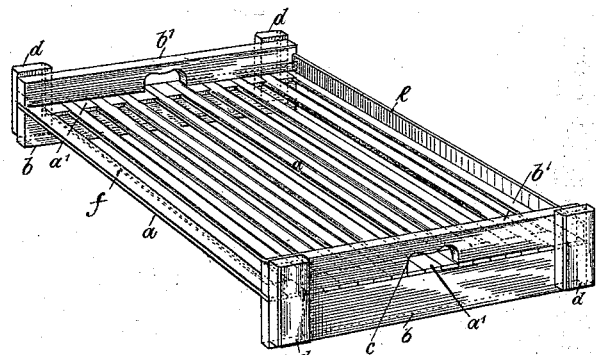
Figure 8:
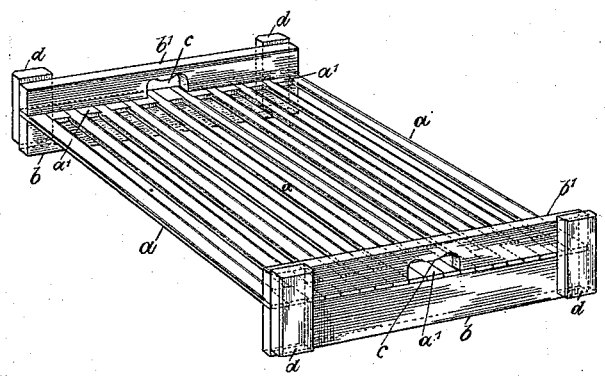

Figure 1 is a plan of my improved tray uncombined with a duplicate. Fig. 2 is a plan of two of my improved trays combined each with a duplicate of itself to provide two stronger trays or to economize space when they are stored away or in transit by rail or otherwise. Fig. 3 is a front elevation of a stack of eleven of my improved trays, illustrating their use as stock-trays. Fig. 4 is a side elevation of a stack of eleven improved trays in use as stock-trays. Fig. 5 is a section on the line 5 5 of Fig. 2. Fig. 6 is a front elevation of two improved trays uncombined and with a vertical ledge combined with one side edge of the floor of each. Fig. 7 is a perspective view of one of the trays of Fig. 6, the presence of a second vertical ledge being indicated in dotted lines. Fig. 8 is a perspective view of one improved tray uncombined.

The bottom or floor of an improved tray may be made of any suitable material and be either solid or open. It is preferably rectangular in shape. The style illustrated is a convenient one, taking into consideration the uses of the invention, for it is light, permits of thorough ventilation, and is capable of preventing, more or less, the articles placed upon the trays rolling up against each other; but it must be distinctly understood that the material, as well as the construction of the bottom or floor of my improved tray, is outside the scope of my invention and may, for that reason, be varied as may be required. The figures show this floor as consisting of a series of parallel slats $a\,a$, separated by equal distances from each other by distance and stiffening pieces $a'\,a'$. The latter and the respective ends of the slats $a\,a$ are made fast in any convenient way in two transverse tray sides. The side edges of the slats $a$ are preferably rounded, the side edges of the pieces $a'\,a'$ being concave or hollowed to fit up to them. Each side is illustrated as consisting of two bars $b\,b'$, fixed edge to edge one upon the other and holding the respective ends of the series of slats and stiffening-pieces firmly between them. The manner in which the tray sides and bottom or floor are made fast to each other may be varied to any extent. As the tray-bottom $a\ a'$ is rectangular in shape the two tray sides $b\ b'$ are necessarily parallel.

$c\ c$ are two hand-holes, one in each top bar $b'$.

$d\ d$ are guides or stops, two on each tray side, fast thereto and with their adjacent faces in the same plane. The four guides are uniform in shape and size. Each one is fixed at or near the outside end of each tray side $b\ b'$. The height of a guide must not be greater than the height of a side $b\ b'$ of the tray or, what is the same thing, not more than the height of the top of the floor of one tray to the top of the floor of the one next above when stacked in position. Each guide projects above its respective tray side and stops short by an equal distance of the bottom thereof. Such projection above the said side $b\ b'$ may be of any suitable degree, but it must be common to the guides of all trays to be used in combination. It is preferable to fix the floor $a\ a'$ of the tray to the sides $b\ b'$ at such a height that the measurement from the bottom of the side to the bottom of the floor is the same as from the bottom of the floor to the top of the guides $d\ d$. The functions of these latter are to guide and maintain in position the next tray put upon the one to which they are affixed, to maintain, when the trays are being put in stacks side by side, a sufficient distance between them for conveniently getting at the hand-holes $c\ c$ of the top trays, to check any tendency there may be for the sides of the tray next above to be moved away from each other the load on its floor, and to strengthen the respective tray sides of which they are a part.

The two bars $b\ b'$, which together constitute a tray side, are not at right angles with the tray-floor $a\ a'$. The internal angle which a bar $b'$ makes with a tray-floor is greater than a right angle, but only by a few degrees. Each bar $b$ is in the same plane as the respective bar $b'$. The object of sloping the tops of the tray sides away from each other to the small extent described and of approximating the bottoms of them to the same extent is to facilitate the engagement of the tray ends of a tray between the stops $d\ d$ of the tray below upon which it is to be stacked.

It is evident that the weight of the fruit upon a tray-floor will tend to distort a tray to the extent of pulling the tops of the tray sides toward each other and by forcing the bottoms thereof away from each other. To prevent this distortion, a single ledge $e$ is combined with the tray. This combination is illustrated in Fig. 6 and the full lines of Fig. 7. The width of the ledge is equal to about two-thirds of the depth of a bar $b'$ and the length of it to that of a slat $a$. The vertical faces of the ends of the two bars $b'\ b'$ are recessed to receive the ends of the ledge $e$ flush with themselves. The position of these recesses is just above the floor of the tray in order that the ledge shall fit down upon it. The utility of sloping the tray ends, as well as of the ledge $e$, will be clearly understood from an inspection of Figs. 6 and 7.

The ledge $e$ has a second purpose—that of preventing fruit rolling over the unprotected edge of the tray-floor. The opposite edge of the said floor is safeguarded by a second ledge $f$, which is in all respects a replica of its fellow ledge $e$.

The adaptation specified above under ($a$) is illustrated in Figs. 3 and 4. As the sides of a tray are parallel with each other and the adjacent faces of them and of the respective guides or stops in the same planes it follows that the tops of any pair of tray sides form a seating guarded by the projecting tops of the respective guides for the bottoms of the tray sides of the tray above, the guides of which rest upon the last-mentioned guides. The tray-bottoms $a\ a'$ are now equidistant shelves and the tray sides $b\ b'$ the stationary sides or frame of the vertical series of shelves by virtue of the respective guides or stops $d\ d$ locking their respective tray sides in two vertical and parallel planes. It is obvious that the heights of the top and bottom bars $b\ b'$ limit the practicable distance between any two trays or shelves $a\ a'$ in the series. So, too, is the necessity of the distance of the projection of a guide or stop $d$ above its tray side $b\ b'$ and by which it stops short of the bottom of the said side, being common to all the trays to be combined in the series of trays or shelves.

The adaptation specified above under ($b$) is illustrated in Figs. 2 and 5. Two trays are combined together to provide a stronger tray by turning one upside down, turning the other one (the duplicate tray) through the angle necessary to set its sides at right angles with those of the inverted tray and laying it down upon the latter. The under faces of the two tray floors or bottoms $a\ a'\ a\ a'$ are now in the same plane; the bottoms (inverted) of the guides $d\ d$ of the inverted tray and the tops of the sides $b'\ b'\ b\ b'$ of the other or top tray are in the same plane; the tops of the sides $b\ b'\ b\ b'$ of the said other or top tray and the bottoms of the sides $b\ b'\ b\ b'$ (inverted) of the inverted tray are in another plane; while the bottoms of the sides $b\ b'\ b\ b'$ of the said other or top tray and the tops (inverted) of the guides $d\ d$ of the inverted tray are in a third plane likewise.

It will be found that the stronger tray has the same practicable area as either the uncombined tray or its duplicate, that it has an upstanding side along its four edges, and also is capable of taking a level bearing upon a level surface. This term "stronger tray" is to be understood as meaning the herein-specified combination of the single trays.

The adaptation specified above under ($c$) is illustrated in Figs. 2 and 5. A single tray is first combined with a duplicate to form one stronger tray. The sides $b\ b'\ b\ b'$ of the top tray of each stronger tray (excepting the bottom one of the series) rest upon the sides $b\ b'\ b\ b'$ and within the stops $d\ d$ of the top tray of the stronger tray beneath. The sides $b\ b'\ b\ b'$ (inverted) of the inverted tray of each stronger tray rest upon, with their stops $d\ d$ outside, the sides $b\ b'\ b\ b'$ (inverted) of the inverted tray of the stronger tray beneath.

The adaptation specified above under ($d$) is illustrated in Figs. 2 and 5. The act of combining single trays together to economize space in respect of storage or of transit is the same as described in the two preceding paragraphs.

The foregoing description, as well as the figures, deal with my improved tray as a square one. It must not be supposed that the invention excludes all other shapes. It does not do so. Oblong trays with sides and guides as described above are included within the invention, but it must be explained that two oblong trays cannot be combined to form a stronger tray, so that neither adaptations ($b$) nor ($c$) can be realized unless the trays are square.

I claim—

1. A tray comprising the bottom, the sides $b, b'$ and guides arranged outside the said sides $b, b'$ said guides ending a short distance above the top and bottom of said sides, substantially as described.

2. A tray comprising two tray members, each member being composed of a bottom and two opposite sides, said tray members being arranged at right angles to each other whereby the two opposite sides of each tray will form a complete wall around the tray, substantially as described.

3. A tray comprising two tray members arranged at right angles to each other, each member being composed of two opposing sides, a bottom and guide-blocks on the outside of the opposing sides, said tray member being arranged with their bottoms superimposed, substantially as described.

4. A tray comprising a pair of tray members arranged with their bottoms superimposed and at right angles to each other, each of said tray members comprising the said bottoms and two opposing sides with the guide-blocks $d$ ending a short distance above the bottom and top of said sides, one of the said tray members being inverted in respect to the other, substantially as described.

5. A tray comprising the slatted bottom, the parallel sides $b, b'$ between the edges of which the ends of the slats are held and the blocks $d, d$, on the sides $b, b'$ connecting the same together.

In witness whereof I have hereunto affixed my signature, in presence of two witnesses, this 15th day of October, 1895.

HENRY ADAIR ORR.

Witnesses:
HENRY H. HIGBY,
JOSEPH LAKE.